(12) United States Patent
Wong et al.

(10) Patent No.: US 7,725,837 B2
(45) Date of Patent: May 25, 2010

(54) DIGITAL IMAGE BROWSER

(75) Inventors: Curtis G. Wong, Medina, WA (US);
David F. Huynh, Cambridge, MA (US);
Patrick M. Baudisch, Seattle, WA (US);
Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/096,615

(22) Filed: Mar. 31, 2005

(65) Prior Publication Data
US 2006/0224993 A1 Oct. 5, 2006

(51) Int. Cl.
*G06F 3/048* (2006.01)
(52) U.S. Cl. ................ 715/815; 715/720; 715/721; 715/838
(58) Field of Classification Search ........... 715/700, 715/713, 716, 717, 730, 731, 732, 735, 744, 715/757, 763, 764, 765, 766, 776, 810, 835, 715/836, 837, 838, 846, 720, 721, 815; 345/418
See application file for complete search history.

(56) References Cited

U.S. PATENT DOCUMENTS

| | | | |
|---|---|---|---|
| 6,785,667 B2 * | 8/2004 | Orbanes et al. | 707/1 |
| 7,216,304 B1 * | 5/2007 | Gourdol et al. | 715/835 |
| 2002/0033837 A1 * | 3/2002 | Munro | 345/654 |
| 2008/0060020 A1 * | 3/2008 | Kelts | 725/56 |

OTHER PUBLICATIONS

Microsoft, Windows XP Screenshots Illustrating Image Browser Functionalities, Copyright 2001.*
Canon Inc., Canon Utilities: ZoomBrowser EX—Software User Guide, Copyright 2003, pp. 26-30.*
Google, Picasa, Released Jan. 18, 2005, Build (18.77).*
"Microsoft Digital Image Suit User's Manual", Microsoft Corporation, 2006. 288 Pages.
Bederson, et al. "Pad++: A Zooming Graphical Interface for Exploring Alternate Interface Physics". Proc. UIST 1994, pp. 17-26.
Bederson,"PhotoMesa: a zoomable image browser using quantum treemaps and bubblemaps", Proc. UIST 2001, pp. 71-80.
Combs., et al. "Does Zooming Improve Image Browsing?" Proc. Digital Libraries 1999, pp. 130-137.
Drucker, et al., "MediaBrowser: reclaiming the shoebox". Proc. AVI 2004, 433-436.
Fertig., et al, Lifestreams: An Alternative to the Desktop Metaphor. Proc. SIGCHI ,1996, pp. 410-411.

(Continued)

*Primary Examiner*—Ba Huynh (57) ABSTRACT

The present subject matter describes a browser for efficiently presenting and browsing a large digital photograph collection. The browser includes a graphical interface—referred to as a time quilt—that combines a wrappable timeline with a space filling layout. Thumbnails representing individual images or clusters of images are laid out chronologically in columns, from top to bottom. When the bottom of a column is reached, a new column is started to the right of the existing column(s). Semantic zooming is used wherein zooming in on a thumbnail image that represents a cluster renders thumbnails of images in the cluster when the thumbnails of the images can be rendered in a legible size. Tiered zooming is also described, which is semantic zooming on multiple levels—representative thumbnails give way to clusters of representative thumbnails that each represent an image or a cluster of images.

20 Claims, 4 Drawing Sheets

OTHER PUBLICATIONS

Frohlich., et al, "Requirements for Photoware"., Proc. CSCW 2002, pp. 166-175.

Graham., et al., "Time as essence for photo browsing through personal digital libraries". Proc. Joint Conf. Digital Libraries, 2002. pp. 326-335.

Jul., et al., "Critical Zones in Desert Fog: Aids to Multiscale Navigation", Proc. UIST 1998, pp. 97-106.

Kang., et al., "Visualization methods for personal photo collections: Browsing and searching in the PhotoFinder". Proc. IEEE Intl. Conf. on Multimedia and Expo, 2000.

Kuchinsky., et al., "FotoFile: a consumer multimedia organization and retrieval system", Proc. SIGCHI 1999, pp. 496-503.

Plaisant., et al.,"LifeLines: Visualizing Personal Histories". Proc. SIGCHI 1996, pp. 221-227.

Platt., et al.,"PhotoTOC: Automatic Clustering for Browsing Personal Photographs". Technical Report MSR-TR-2002-17, Microsoft Research, 2002. pp. 1-5.

Ringel,. Milestones in Time: The Value of Landmarks in Retrieving Information from Personal Stores. Proc. Interact 2003. pp. 1-8.

Suh., et al., Automatic Thumbnail Cropping and Its Effectiveness. Proc. UIST 2003, pp. 95-104.

Rodden., et al., "How Do People Manage Their Digital Photographs?", Proc. SIGCHI 2003, pp. 409-416.

* cited by examiner

DIGITAL IMAGE BROWSER

TECHNICAL FIELD

The following description relates generally to digital imaging. More particularly, the following description relates to browsers for browsing digital images.

BACKGROUND

As digital photography becomes more ubiquitous, people are finding themselves with huge digital image collections that are increasingly harder to manage. Specifically, browsing digital image collections requires significant time and manual effort. Usually, a digital image collection is organized according to digital image metadata, which typically consists only of a date that the image was taken. Organizing digital photographs in a timeline according to image dates is somewhat efficient, but using a timeline to present the digital photographs does not make efficient use of a display area. Other techniques that emphasize space savings methods manage to maximize screen space but fail to effectively convey temporal order.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a depiction of a digital image cluster that is presented when the representative image shown in FIG. 3 is zoomed in on.

FIG. 5 is a depiction of an exemplary image array that is presented when a representative image included in the digital image array of FIG. 4 is zoomed in on.

DETAILED DESCRIPTION

Overview

The presently described subject matter provides an efficient way to browse a large collection of digital images. The lower cost of taking and storing digital photographs as opposed to using film has contributed to users amassing large collections of photographs. As a photo collection grows, it becomes harder to manage. Particularly, it takes time and effort to create structures that facilitate browsing and searching such a collection, such as tagging the photos with keywords, filing them into a hierarchy of file folders and annotating them with comments.

But the very aspect of the collection that demands organization—its size—also defies manual organization. Techniques are available for automatically indexing photo collections by visual content analysis or by creation dates of photographs. However, these techniques have certain drawbacks.

A digital photograph collection may be organized according to a space filling technique that utilizes as much screen space as possible so that as many photographs as possible may be displayed at one time. But space filling techniques do not provide for a temporal ordering of photographs. While some space filling techniques provide for clusters of photographs to be represented by a single representative image and for the clusters to be amassed according to creation dates of images included therein, there is no overall accommodation that provides a user to see a photograph collection displayed in temporal order.

A timeline may be used to display photographs or representative images of clusters of photographs, but a timeline does not make efficient use of screen space and thus requires a user to scroll through numerous screens to view a large portion of the photograph collection.

The present description relates to a layout—referred to herein as a "time quilt"—that combines the benefits of a timeline with those of a space filling technique. The time quilt layout wraps miniature versions of digital photographs (i.e. thumbnail sketches, or "thumbnails") and/or representative images of clusters of digital photographs in columns presented according to temporal order. As used herein, a representative image of a cluster of photographs is a thumbnail of a photograph contained in the cluster that is used to represent the cluster. In effect, such a presentation compresses a typical timeline in a horizontal manner.

The time quilt layout described herein may be implemented as a zoomable photo browser. In other words, a user may increase or decrease the size of the photographs in a collection by zooming in on or out from a particular view of the collection. This allows a user to zoom out to view a large number of photographs, or zoom in to focus in on a single photograph or a smaller group of photographs.

One problem that arises from zooming is that photographic details cannot be legibly presented when a thumbnail is diminished beyond a certain size. To overcome this problem, semantic zooming may be implemented in accordance with the present description. With semantic zooming, a representative thumbnail image replaces a cluster of thumbnails when a user zooms out to a point where the individual thumbnails contained in the cluster are rendered too small to be of use to a user.

In at least one implementation described herein, tiered zooming may also be used. Tiered zooming is semantic zooming implemented on several levels. As a user zooms out while viewing a number of thumbnail images (that each represent a digital image), clusters of thumbnails are replaced by primary representative thumbnails (as described above). As the user continues to zoom out, clusters of the primary representative thumbnails are in turn replaced by secondary representative thumbnails. This may continue with any practical number of levels, thus allowing a vast number of photographs to be represented within the timeline of the time quilt.

In a tiered zooming implementation, an indicator is provided that allows a user to discriminate between thumbnails that represent individual images and thumbnails that represent clusters of thumbnails. This may be implemented in any number of ways, such as providing a special border (e.g. double lines) around thumbnails that represent individual images. When the indicator is present, the user knows that zooming further in on particular images will not reveal additional images.

These and other features are shown and described in greater detail below, with respect to the figures provided herewith.

Exemplary Time Quilt

Figure 1:
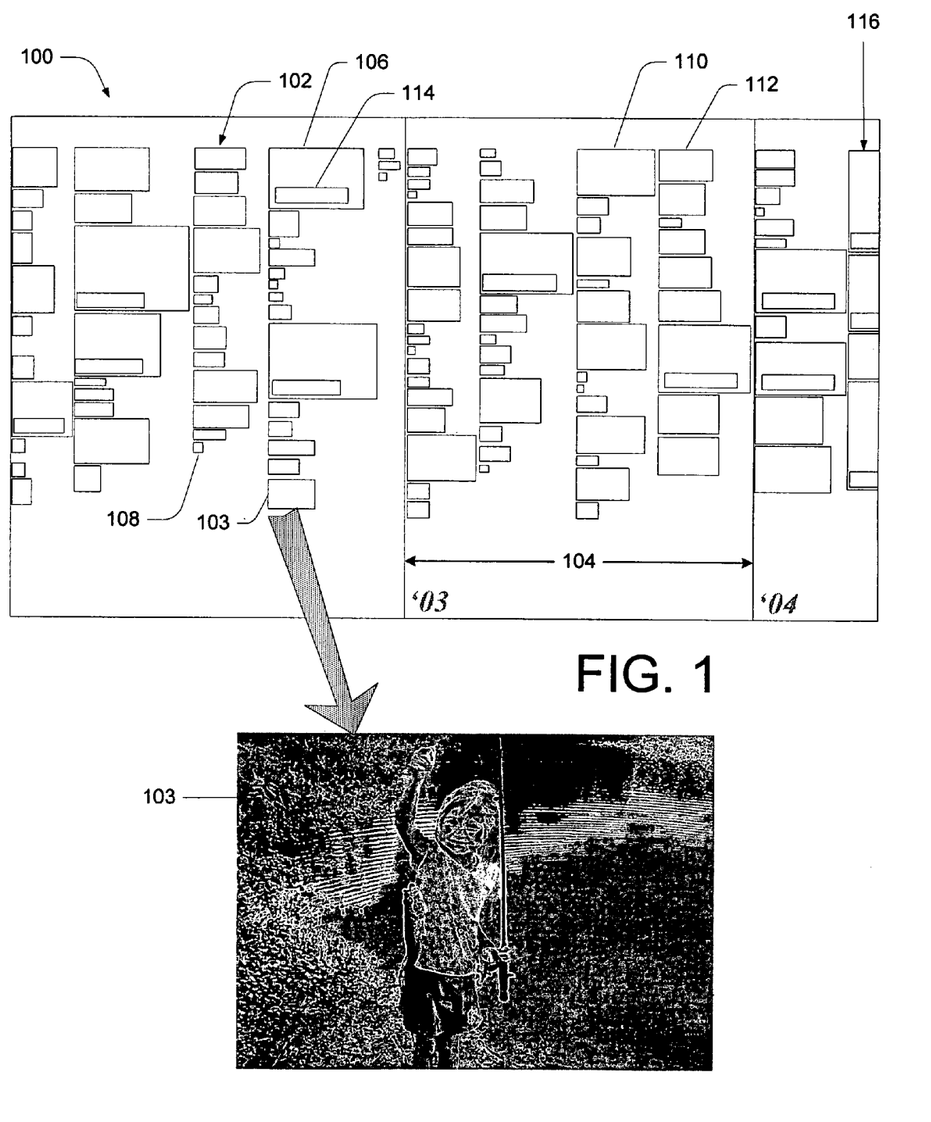
FIG. 1 is a depiction of multiple digital images displayed as an exemplary time quilt that utilizes timelines as well as a space savings layout.

FIG. 1 illustrates an exemplary time quilt 100 in accordance with the present description. The exemplary time quilt 100 includes several thumbnail images 102 (depicted as quadrilateral outlines), each of which represents one or more digital photographic images. The thumbnail images 102 are displayed in a columnar fashion according to a date associated with each photograph represented by the thumbnail images 102. It is noted that in practice, the quadrilateral outlines are actual digital photographic images. For example, quadrilateral outline 103 is shown enlarged as an exemplary image 103 as it would actually appear in practice.

The thumbnail images 102 are laid out according to a date and/or time associated with each thumbnail image 102, i.e. a timeline. Such a layout proceeds from top to bottom and from left to right. Thumbnail images 102 having earlier dates/times associated therewith are displayed above thumbnail images 102 having later dates/times. When a column is filled—i.e. when another thumbnail image will not fit in a column—thumbnail images 102 associated with even later dates/times are displayed at the tope of a new column to the right of the previous column.

Thus, the temporal layout of the thumbnail images 102 wraps from column to column, thereby making efficient use of display screen space. When a time boundary is encountered, a column terminates and a first thumbnail image corresponding to the time boundary begins a new column.

It is noted that although the presently described example utilizes columns to display a timeline, other visual formats indicating temporal relation may be implemented. Horizontal rows, spiral columns, a virtual torus, etc. may also me used. Furthermore, the temporal order does not have to proceed from left to right; it may proceed from top to bottom, right to left, etc.

The exemplary time quilt 100 includes one or more time boundaries 104. In this particular example, there are two time boundaries 104 that are year boundaries representing boundaries between year 2002 and year 2003 ("'03"), and between year 2003 and year 2004 ("'04"). Note that the year 2002 can be inferred from the time quilt 100 even though no indicia explicitly identifies year 2002. It is implicit in the example shown that a time boundary (not shown) having an indicator of 2002 ("'02") would appear in the screen if the screen were scrolled to the left.

In alternative implementations, the time boundaries 104 may be boundaries between months of the same year or some other time division, depending on the number of photographs represented and the temporal distribution of the photographs. Furthermore, the time boundaries 104 do not necessarily have to be represented as vertical lines as shown in this example; time boundaries may take the form of shading gradients, differing colors, or any other visual identifier that may be used to demarcate one time period from another.

If, for instance, there are a thousand (1000) photographs represented that were all taken in the same year, it may be more efficient to provide monthly time boundaries. The time boundaries may be automatically generated or they may be user defined. In one particular implementation, the time boundaries are initially generated automatically and then may be adjusted by a user.

The thumbnail images 102 shown in the time quilt 100 include representative thumbnail images 106 that represent a cluster of photographs and individual thumbnail images 108 that each represents a single photograph. A size of a thumbnail image 102 indicates whether the thumbnail image 102 is a representative thumbnail image 106 or an individual thumbnail image 108. Individual thumbnail images 108 are logically the smallest size of thumbnail images displayed in the time quilt 100.

From a cluster of digital images, a user may select a digital image that is to be used as a representative thumbnail image to represent the cluster. This decision may also be made automatically, such as selecting an image having an earliest date (relative to the other images in the cluster), or selecting an image based on it's location in the cluster (central, top right, etc.). Other criteria may be used to select a representative image from a cluster of images, such as selecting an image from images that contain faces, are close to a median color histogram or are not illegible (i.e. blurry and/or dark), etc.

A representative thumbnail image may also be composed from more than a single image. For example, a representative thumbnail image may include at least portions of four individual images (or more or fewer) from the cluster of images represented by the representative thumbnail image.

A size of a representative thumbnail image 102 generally indicates how many photographs are represented by the representative thumbnail image 102, relative to other representative thumbnail images. For example, it may be inferred that representative thumbnail 110 represents a cluster containing more images that a cluster represented by representative thumbnail 112, since representative image 110 is larger than representative image 112.

In one or more implementation, inferences may be made from the aspect ratio of a particular thumbnail image 102. For example, a thumbnail image having a width greater than its height (e.g. thumbnail image 114) might indicate that the photographs in the cluster represented by the thumbnail image 114 were taken in relatively close temporal proximity to each other. Therefore, a cluster of several photographs taken on the same day would be represented as a rectangular shape.

Conversely, photographs in a cluster represented by a thumbnail image having a more equal width and height (e.g. thumbnail 110) were taken over a longer period of time. This is a logical conclusion from the representation since a height of any representative thumbnail corresponds to the temporal axis of the timeline incorporated into the time quilt 100.

When a representative thumbnail image 106 can be displayed at a sufficient size, a date field 114 may be overlaid on the representative thumbnail image 106. For example, the date filed 114 may contain the literal "Apr. 6, 2002" which identifies the date on which the photograph corresponding to representative thumbnail image 106 was taken. This additional indicia of a time frame for a cluster of photographs represented by representative thumbnail image 106 adds to a user's comprehension of time along the timeline of the time quilt 100. If the representative thumbnail image 106 is too small to render a readable date, then the date filed 114 may be omitted.

In at least one alternative implementation, the date field 114 may be used to express another form of literal, such as an item of metadata other than the date. Although image files typically do not contain metadata other than a date the image was taken, if metadata were present that indicated where a photograph was taken, that metadata may be included in the date field 114. Or, the date field 114 may be configurable by a user to annotate images.

A column 116 of thumbnail images is partially shown on the right side of the time quilt 100 representation. This indicates that the time quilt 100 continues and more thumbnail images will appear if upon scrolling to the right. As new images are added to the collection of photographs comprising the time quilt 100, the new images are simply incorporated into the time quilt 100.

Typically, new additions will be more recent photographs. In this scenario, a user who is familiar with the look of a particular time quilt 100 (one, that represents the user's photograph collection) will find that the familiarity of the time quilt 100 does not change when new, later photographs are added to the time quilt 100. This feature helps maintain a familiar pattern with the user, allowing the user to more easily locate particular photographs or clusters. This is in contrast to a traditional space filling layout, which necessarily changes each time additions are made to the collection, thus requiring a user to lose track of familiar locations within the layout.

It is noted that the time quilt 100 incorporates whitespace in between the clusters (i.e. representative thumbnail images 102) due to the clusters being aligned according to columns. Such whitespace is not included in traditional space filling layouts. This inter-cluster whitespace—absent in space filling layouts by design—acts as a design element that unites and separates other design elements, communicating structure and flow.

The cluster being arranged in columns with inter-cluster whitespace forms a non-uniform pattern that facilitates spatial memory required when a user is trying to re-locate a particular cluster. As such, the whitespace adds efficiency as well as aesthetic value to the time quilt design.

Although the time quilt 100 is shown temporally progressing in a columnar fashion, other ways to weave the timeline within the time quilt 100 may be implemented without departing from the present description. For example, thumbnail images 102 may be laid out in a spiral or zigzag pattern. However, columnar wrapping is familiar to most users and most users will infer a temporal order from such a layout, i.e. that if a thumbnail image is located to the right of another thumbnail image it is later in time. Or, that if two thumbnail images appear in the same column, the thumbnail image appearing at a lower position is later in time.

Semantic Zooming

Figure 2:
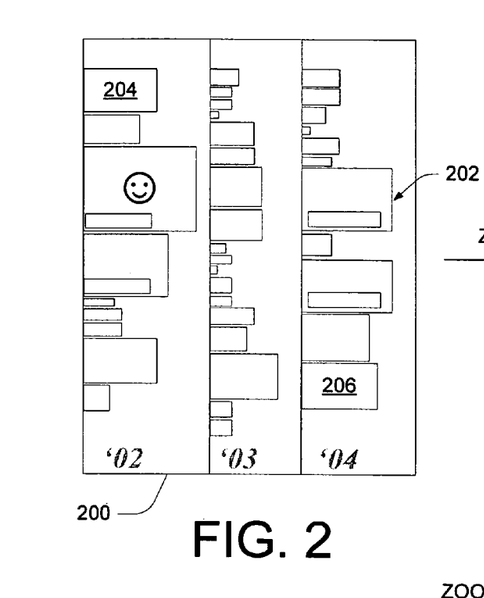
FIG. 2 is a depiction of an exemplary time quilt display.

FIG. 2 is a depiction of an exemplary time quilt 200 displayed in accordance with the present description. The exemplary time quilt 200 includes several thumbnail images 202 arranged in columns according to chronological order. A thumbnail image 204 associated with an earliest date and/or time is displayed above and/or to the left of a thumbnail image 206 that has a latest date/time associated therewith. A logical timeline extends downward from thumbnail image 204 and wraps from column to column.

For discussion purposes, one particular thumbnail image (thumbnail image 208) has been identified with a "smiley face" symbol (" ☺ ") so that the thumbnail image 208 can be tracked in later figures to exemplify one or more zooming processes that may be implemented with the time quilt 200.

Figure 3:
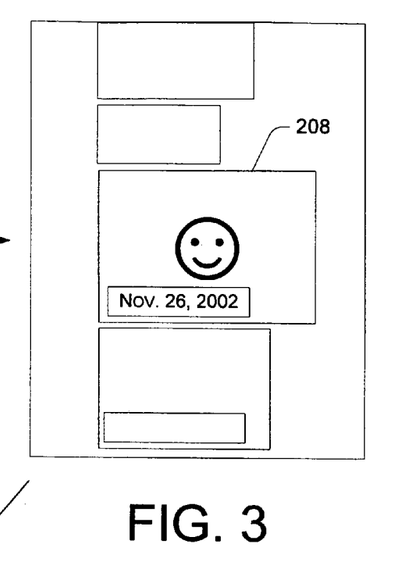
FIG. 3 is a depiction of a zoomed representative image from the time quilt display shown in FIG. 2.

FIG. 3 depicts the thumbnail image 208 shown in FIG. 2 after the thumbnail image 208 has been zoomed in on by a user. At the level of zooming depicted in FIG. 3, the thumbnail image 208 is merely shown as an enlarged version of the thumbnail image 208 as it appears in FIG. 2. However, when the zoom level is increased even further, individual thumbnail images represented by the representative thumbnail image 208 appear in place of the representative thumbnail image 208.

This is semantic zooming. Semantic zooming is based on the observable fact that, at a certain zoom level, individual thumbnails become too small to be recognizable. When this occurs, a representative image from a cluster of images is rendered in place of the diminishing thumbnails. This process is described in greater detail below, with respect to FIG. 4.

Figure 4:
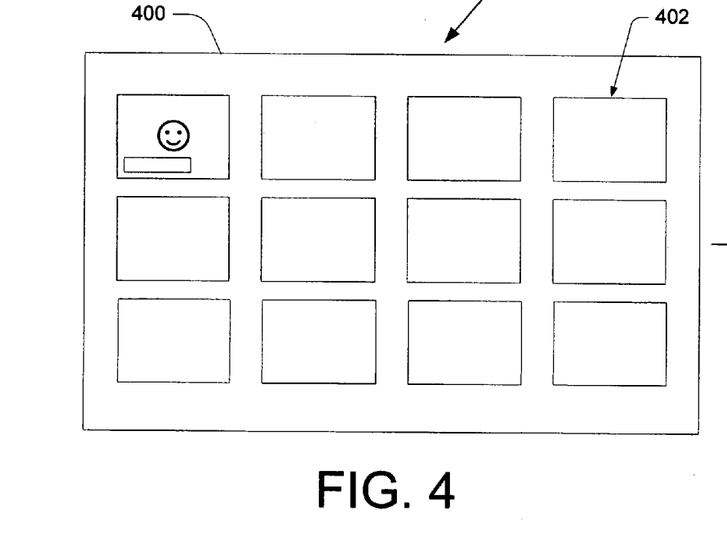

FIG. 4 is a depiction of a digital image cluster 400 that is rendered when the representative thumbnail image 208 shown in FIG. 3 is zoomed to a threshold zoom level. The threshold zoom level may be pre-configured or it may be user-configurable.

Generally, a threshold zoom level is a level at which details of the thumbnail images will not be legible. Therefore, when this level is reached when zooming out, the thumbnail images are replaced by a single, larger thumbnail image of a representative image from the cluster. When the threshold level is reached when zooming in, a thumbnail image of a representative image is replaced by renderings of thumbnail images of images included in the cluster.

The cluster 400 includes thumbnail image 208, which was selected as a representative thumbnail image to represent the cluster 400 when the zooming reached a particular level. If the zooming process is reversed (i.e. from FIG. 4 to FIG. 3), then the cluster 400 is replaced by the representative thumbnail image 208 (as in FIG. 3).

Tiered Zooming

Figure 5:
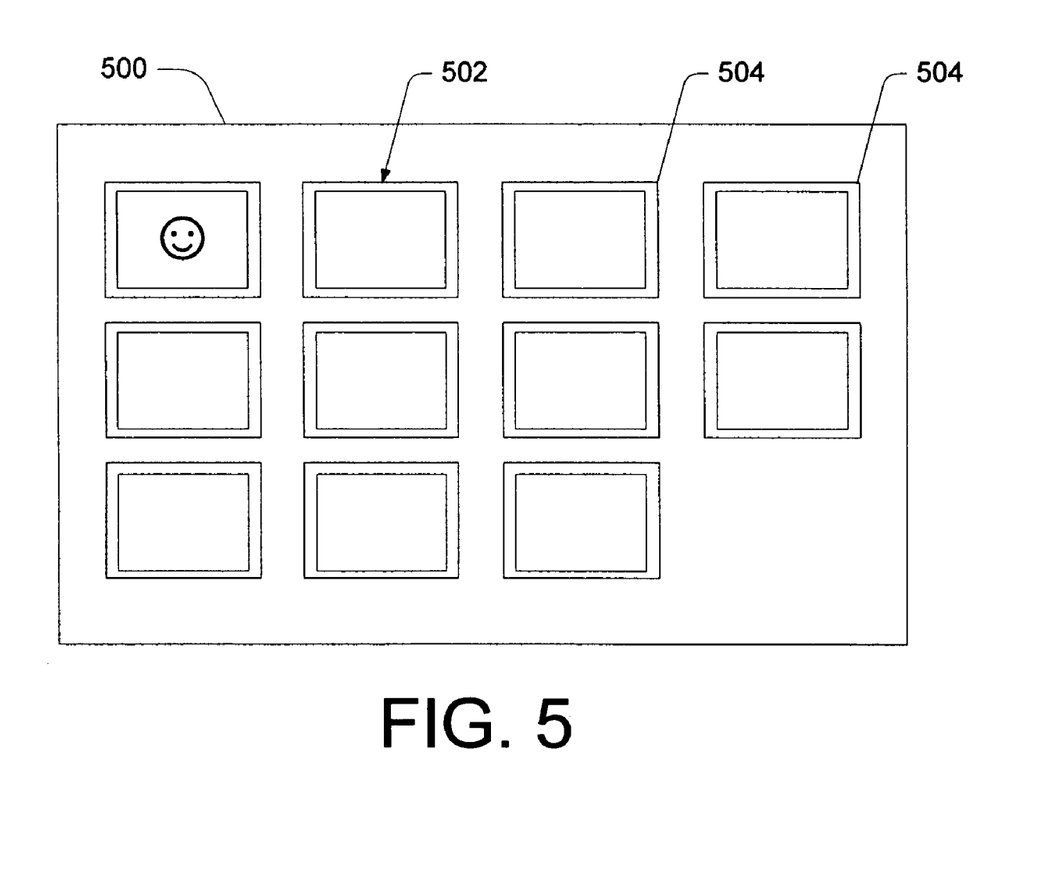

FIG. 5 is a depiction of an exemplary image cluster 500 that is rendered when the representative thumbnail image 208 shown in FIG. 4 is zoomed in on to an even greater degree than shown in FIG. 4. Tiered zooming is semantic zooming on multiple levels. In other words, images 402 included in the cluster 400 shown in FIG. 4 may all be representative thumbnail images that each represents a cluster of digital images.

When the representative thumbnail image 208 (FIG. 4) is zoomed in on, the representative image 208 is replaced by the exemplary image cluster 500. In effect, tiered zooming is recursive semantic zooming. The rendering of clusters from representative images (or of representative images from clusters) may be done on any number of practicable levels.

However, when different levels of semantic zooming are implemented, it is desirable that a user know when the user is viewing representative thumbnails or thumbnails of individual photographs. To do this, a primary image indicator is provided that allows a user to discriminate between thumbnails that represent individual images and thumbnails that represent clusters. When the primary image indicator is present, the user knows that the user is viewing thumbnails of individual images.

In the present example, a primary image indicator 504 consists of a double border around a thumbnail image 502. In this particular implementation, when a thumbnail image 502 is surrounded by a double border 504, a user knows that the user is viewing thumbnails of individual images and that the user cannot zoom in on such a thumbnail to reveal additional images.

In one or more alternative implementations, other primary image indicators may be used. For example, a small symbol may be rendered in an unobtrusive location of a thumbnail image to indicate that the thumbnail image represents an individual image. A converse method may also be used wherein the presence of an indicator in proximity with a thumbnail image indicates that the thumbnail image represents a cluster and that zooming in on the thumbnail image will reveal one or more other thumbnails.

The method of implementing the zooming may differ among implementations. A typical mouse wheel zooming method may be utilized wherein scrolling a mouse wheel forward zooms into where a mouse cursor points and scrolling backward zooms out. Panning may also be implemented, such as by dragging with a left mouse button.

In one or more implementations, zooming levels and/or panning ranges may be limited to prevent users from getting lost in whitespace or from zooming in on a thumbnail image (that is not representative of a cluster) to a point where no part of the thumbnail image is recognizable.

Exemplary Operating Environment

Figure 6:
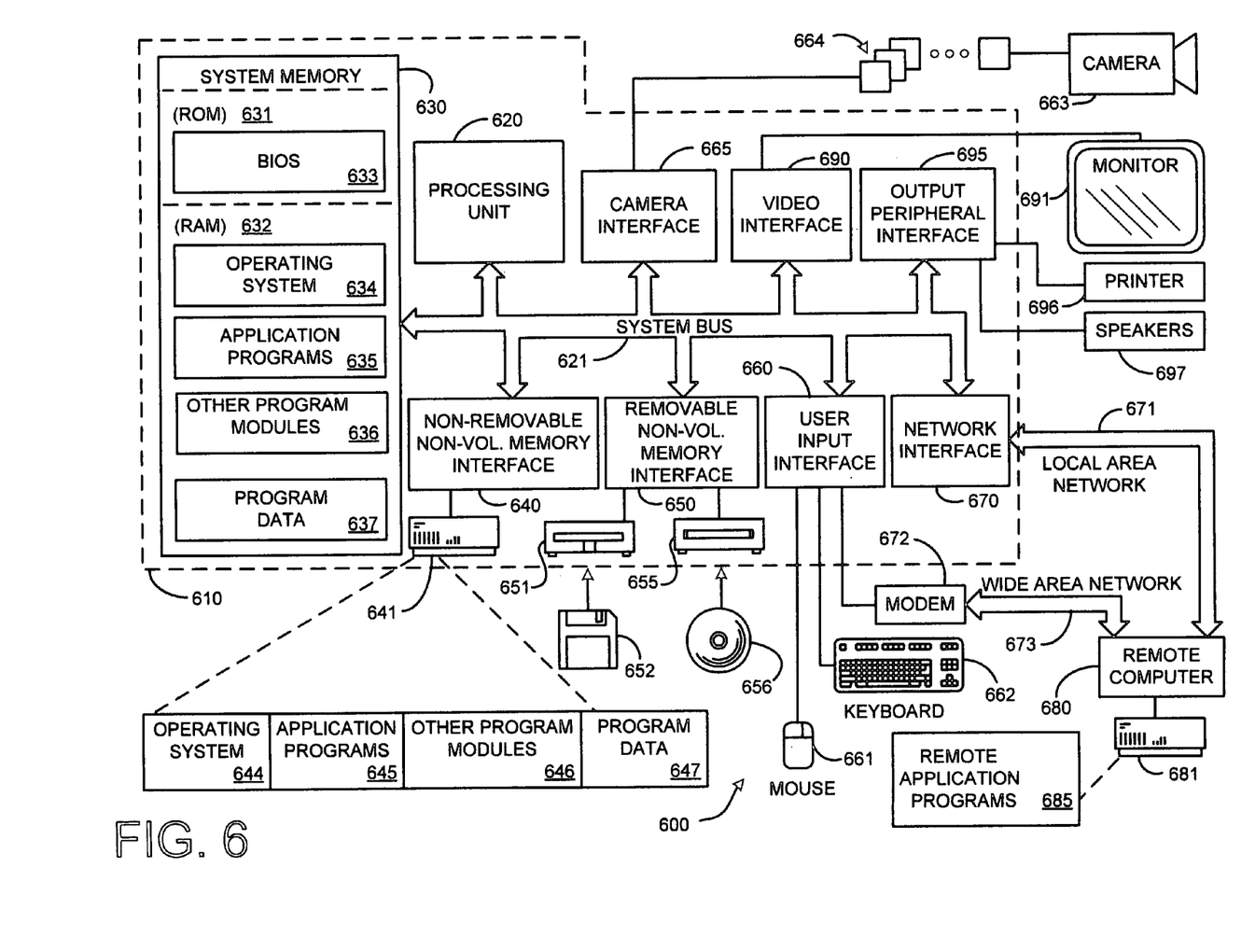
FIG. 6 is a block diagram depicting an exemplary general purpose computing device that may be used in conjunction with one or more described techniques and/or systems.

FIG. 6 is a block diagram depicting a general purpose computing environment 600 that may be used in one or more implementations according to the present description. The computing system environment 600 is only one example of a suitable computing environment and is not intended to suggest any limitation as to the scope of use or functionality of the claimed subject matter. Neither should the computing environment 600 be interpreted as having any dependency or requirement relating to any one or combination of components illustrated in the exemplary operating environment 600.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through anon-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695. Of particular significance to the present invention, a camera 663 (such as a digital/electronic still or video camera, or film/photographic scanner) capable of capturing a sequence of images 664 can also be included as an input device to the personal computer 610. Further, while just one camera is depicted, multiple cameras could be included as an input device to the personal computer 610. The images 664 from the one or more cameras are input into the computer 610 via an appropriate camera interface 665. This interface 665 is connected to the system bus 621, thereby allowing the images to be routed to and stored in the RAM 632, or one of the other data storage devices associated with the computer 610. However, it is noted that image data can be input into the computer 610 from any of the aforementioned computer-readable media as well, without requiring the use of the camera 663.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

CONCLUSION

While one or more exemplary implementations have been illustrated and described, it will be appreciated that various changes can be made therein without departing from the spirit and scope of the claims appended hereto.

The invention claimed is:

1. A method of allowing a user to interactively zoom in and out of thumbnails displayed in a display area, the method comprising:

enabling a user to control the size of the thumbnails in the display area by interactively changing a zoom level that correspondingly expands and contracts the thumbnails displayed in the display area, wherein the thumbnails comprise resizings of images in a collection of images being navigated via the changes in zoom level;

as the user is zooming in to cause the thumbnails to be correspondingly displayed in the display area such that they appear to gradually increase in size relative to the display area, the thumbnails including a plurality of representative thumbnails that also appear to be increasing in size during the zooming in, each representative thumbnail representing a cluster of thumbnails not initially displayed during the zooming in, and during the zooming in repeatedly checking if a first zoom threshold is reached, and automatically responding to determining that the first zoom threshold is reached during the zooming by:

automatically reducing the size of the displayed representative thumbnails in the display area, and using space created thereby to automatically newly display in the display area clusters of thumbnails represented by the representative thumbnails, respectively; and after automatically decreasing the size of the displayed representative thumbnails and newly displaying the clusters of thumbnails, continuing the zooming in by the user which causes the reduced representative thumbnails continue to appear to gradually increase in size and which causes any thumbnails in the clusters that are in the display area to also appear to gradually increase in size.

2. A method according to claim 1, further comprising displaying the representative thumbnails in a manner that visibly distinguishes them from thumbnails in the display area that do not represent clusters.

3. A method according to claim 1, further comprising automatically determining which of the thumbnails will serve as representative thumbnails.

4. A method according to claim 1, further comprising receiving input from the user designating a thumbnail as a representative thumbnail.

5. A method according to claim 1, wherein the size of a representative thumbnail is based in part on how many thumbnails it represents.

6. A method according to claim 1, wherein when the clusters of thumbnails are newly displayed they are automatically displayed based on dates associated with images from which the thumbnails are derived.

7. A method according to claim 1, wherein which thumbnails belong to a cluster is automatically determined based on dates of images from which the thumbnails of the cluster were derived.

8. One or more computer readable storage media storing information to enable a computing device to perform a process, the process comprising:

automatically maintaining a display of thumbnails of images that are automatically selected for display and undisplay responsive to zoom-in and zoom-out operations, where the thumbnails are chronologically ordered in the display according to dates of the thumbnails;

responsive to user input, performing the zoom-in and zoom-out operations on the chronologically ordered display of thumbnails by, while maintaining the chronological order, displaying gradual expansion and shrinkage of the thumbnails in the chronologically ordered display, the thumbnails including a first representative thumbnail representing a first cluster of undisplayed thumbnails and including a second representative thumbnail representing a second cluster of undisplayed thumbnails; and while user input continues to invoke zoom-in operations and the first and second displayed representative thumbnails appear to be gradually expanding, automatically decreasing the displayed size of the first and second representative thumbnails and in display space made available by the decreasing, automatically newly displaying in the chronologically ordered display of thumbnails, both the first cluster of thumbnails and the second cluster of thumbnails, after which the zoom-in operations continue and the displayed first and second representative thumbnails as well as the displayed clusters of thumbnails appear to gradually increase in size.

9. One or more computer readable storage media according to claim 8, wherein some of the newly displayed thumbnails comprise other representative thumbnails that represent additional clusters of thumbnails that are newly displayed after further zoom-in operations reduce the size of the other representative thumbnails.

10. One or more computer storage readable storage media according to claim 8, wherein the first and second clusters of thumbnails that are undisplayed include representative thumbnails that had previously represented undisplayed thumbnails.

11. One or more computer readable storage media according to claim 8, further comprising:

as thumbnails are displayed and undisplayed, maintaining an arrangement of the displayed thumbnails such that: thumbnails are displayed in a row or column of visibly distinct sub-areas, each sub-area corresponding to a different time span of a same unit of time and each sub-area contains only thumbnails of images having dates that fall within its time span.

12. One or more computer readable storage media according to claim 11, wherein each sub-area comprises chronologically ordered rows or columns of the thumbnails therein, and the thumbnails within a row or column are chronologically ordered.

13. One or more computer readable storage media according to claim 8, further comprising displaying indicia that visibly distinguishes representative thumbnails from other thumbnails that are not representative thumbnails.

14. One or more computer readable storage media according to claim 8, the process further comprising receiving other user input identifying a thumbnail to be the representative thumbnail for one of the clusters of thumbnails.

15. One or more computer readable storage media according to claim 8, wherein the user input controls a zoom level that controls the expansion and shrinkage of the thumbnails, and the undisplaying of thumbnails and newly displaying of cluster is preformed based on the zoom level.

16. A computing device configured to perform a process, the process comprising:

accessing a collection of images and rendering thumbnails comprising versions of the images, respectively, the thumbnails including primary representative thumbnails and secondary representative thumbnails, the primary representative thumbnails representing clusters of the thumbnails including secondary representative thumbnails, the secondary thumbnails also representing clusters of the thumbnails;

displaying in a display area some of the thumbnails;

responding to user input that controls zooming of the thumbnails in the display area by displaying gradual increasing and decreasing the size of the thumbnails in the display area, wherein the thumbnails in the display area are displayed such that they appear to gradually increase and decrease in size; and as the primary representative thumbnails and clusters of thumbnails that they represent appear to gradually decrease in size while zooming out responsive to the user input:

interrupting the zooming out and gradual decreasing by automatically undisplaying clusters represented by the primary representative thumbnails and for each undisplayed cluster automatically enlarging the displayed size of the corresponding displaying an enlarged primary representative thumbnail, and resuming the zooming out wherein the enlarged representative thumbnails continue to appear to gradually decrease in size.

17. A computing device according to claim 16, the process further comprising displaying time boundaries that demarcate different time spans of the thumbnails.

18. A computing device according to claim 16, the process further comprising: as thumbnails are displayed and undisplayed, whichever thumbnails are displayed are arranged as follows: thumbnails are displayed in linearly arranged sub-areas of the display area according to dates of the thumbnails, each sub-area comprising a time span and containing thumbnails whose dates fall within the time span of the sub-area, and each sub-areas time span spans a same unit of time.

19. A computing device according to claim 18, wherein thumbnails and representative thumbnails displayed at one time in a sub-area do not have a uniform size but rather vary in size.

20. A computing device according to claim 16, the process further comprising:

interrupting the resumed zooming out by automatically undisplaying clusters of the thumbnails that are represented by the secondary representative thumbnails and automatically enlarging the displayed size of the corresponding secondary representative thumbnails.

* * * * *